(12) United States Patent
Votta et al.

(10) Patent No.: US 7,975,175 B2
(45) Date of Patent: Jul. 5, 2011

(54) RISK INDICES FOR ENHANCED THROUGHPUT IN COMPUTING SYSTEMS

(75) Inventors: Lawrence G. Votta, Sammamish, WA (US); Keith A. Whisnant, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 297 days.

(21) Appl. No.: 12/170,239

(22) Filed: Jul. 9, 2008

(65) Prior Publication Data

US 2010/0011254 A1 Jan. 14, 2010

(51) Int. Cl.
*G06F 11/00* (2006.01)

(52) U.S. Cl. ............................... 714/15; 714/13; 714/47
(58) Field of Classification Search .............. 714/10–13, 714/15, 47, 4
See application file for complete search history.

(56) References Cited

U.S. PATENT DOCUMENTS

| 6,044,475 | A * | 3/2000 | Chung et al. | 714/15 |
|---|---|---|---|---|
| 6,629,266 | B1 * | 9/2003 | Harper et al. | 714/38 |
| 6,918,066 | B2 * | 7/2005 | Dutta et al. | 714/46 |
| 7,020,802 | B2 | 3/2006 | Gross et al. | |
| 7,100,079 | B2 * | 8/2006 | Gross et al. | 714/23 |
| 7,571,347 | B2 * | 8/2009 | Gross et al. | 714/15 |
| 7,730,364 | B2 * | 6/2010 | Chang et al. | 714/47 |
| 2006/0168473 | A1 * | 7/2006 | Sahoo et al. | 714/15 |
| 2007/0220298 | A1 * | 9/2007 | Gross et al. | 714/2 |
| 2007/0277056 | A1 * | 11/2007 | Varadarajan et al. | 714/15 |

* cited by examiner

*Primary Examiner* — Yolanda L Wilson
(74) *Attorney, Agent, or Firm* — Park, Vaughan, Fleming & Dowler LLP; Steven Stupp

(57) ABSTRACT

Embodiments of a system that adjusts a checkpointing frequency in a distributed computing system that executes multiple jobs are described. During operation, the system receives signals associated with the operation of the computing nodes. Then, the system determines risk metrics for the computing nodes using a pattern-recognition technique to identify anomalous signals in the received signals. Next, the system adjusts a checkpointing frequency of a given checkpoint for a given computing node based on a comparison of a risk metric associated with the given computing node and a threshold, thereby implementing holistic fault tolerance, in which prediction and prevention of potential faults occurs across the distributed computing system.

20 Claims, 9 Drawing Sheets

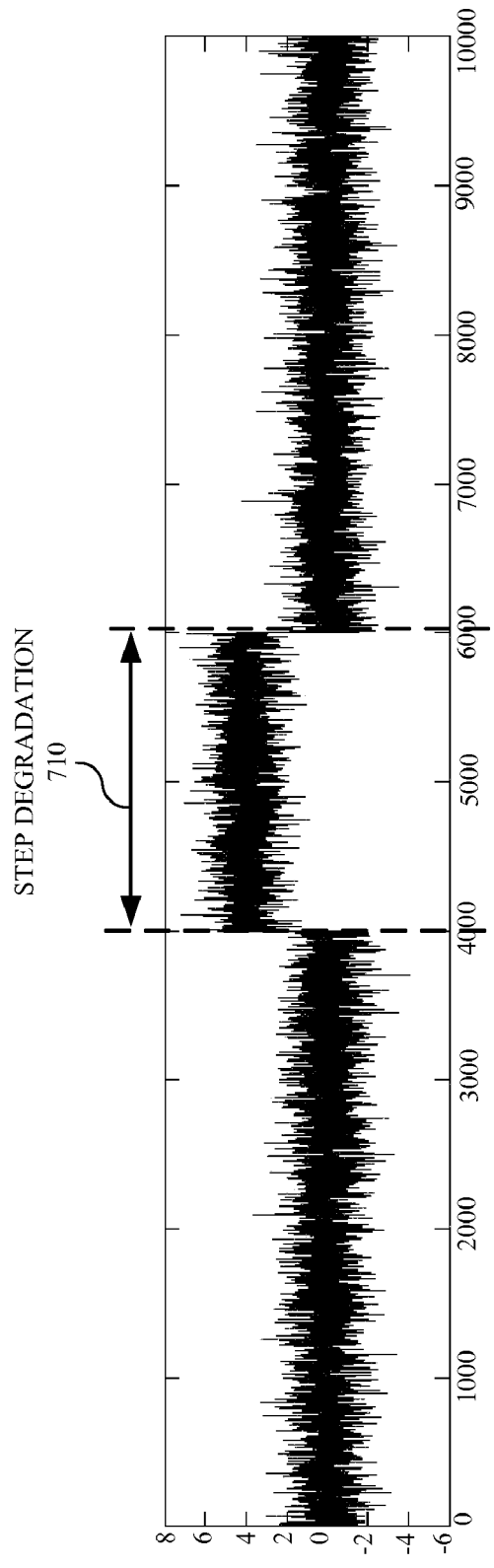
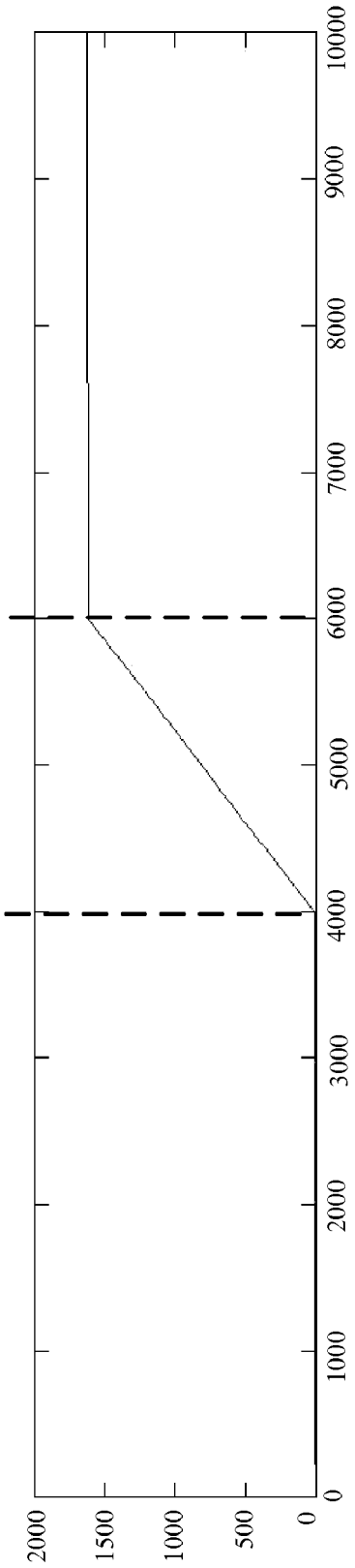
FIG. 7A
FIG. 7B

RISK INDICES FOR ENHANCED THROUGHPUT IN COMPUTING SYSTEMS

RELATED APPLICATIONS

This application is related to: (1) U.S. Pat. No. 7,269,536, entitled "Method and Apparatus for Quantitatively Determining Severity of Degradation in a Signal," by Kenny C. Gross, Keith A. Whisnant, and Gregory A. Cumberford, having Ser. No. 11/389,578, and filing date Mar. 23, 2006; (2) pending U.S. patent application entitled "Method and Apparatus for Providing Fault-Tolerance in Parallel-Processing Systems," by Kenny C. Gross and Alan P. Wood, having Ser. No. 11/385,429, and filing date Mar. 20, 2006; and (3) pending U.S. patent application entitled "Enhancing Throughput and Fault Tolerance in a Parallel-Processing System," by Kenny C. Gross and Alan P. Wood, having Ser. No. 11/371,998, and filing date Mar. 8, 2006, the contents of each of which are hereby incorporated by reference.

BACKGROUND

1. Field of the Invention

The present invention relates to computing systems and techniques for enhancing throughput in these computing systems. More specifically, the present invention relates to adjusting a checkpointing frequency in computing systems based on risk metrics for computing nodes in these computing systems.

2. Related Art

Distributed high-performance computing systems (such as grid computing), in which multiple computing nodes are linked by optical fibers, can provide significant computational capacity. These computing systems allow complicated problems to be divided into separate jobs that are processed in parallel by the computing nodes.

However, as the size and complexity of a computing system increases, the computing system can become more vulnerable to failures. For example, if there is a failure on a computing node that is executing one of the jobs, all of the jobs may need to be repeated.

In existing computing systems, this problem can be addressed using checkpointing. During checkpointing, the operation of a computing node is typically interrupted and a current state of a job executing on the computing node may be stored to facilitate a subsequent recovery of the job in the event of a failure.

Unfortunately, the input/output bandwidth of the optical links has been increasing more slowly than other components in a grid computing system, such as: processor performance, Linpack performance, and hard-disk-drive capacity. As the performance of these other components increases, the amount of data to be checkpointed correspondingly increases. However, this increase in data has not been matched by a corresponding increase in I/O bandwidth through the optical links. Consequently, the time needed to checkpoint large-grid computing systems through such optical links has been increasing and may soon exceed the mean time between failure of computing nodes in such computing systems.

Hence, there is a need to provide other techniques for checkpointing computing nodes in a computing system.

SUMMARY

One embodiment of the present invention provides a system that adjusts a checkpointing frequency in a distributed computing system that executes multiple jobs. During operation, the system receives signals associated with the operation of the computing nodes. Then, the system determines risk metrics for the computing nodes using a pattern-recognition technique to identify anomalous signals in the received signals. Next, the system adjusts a checkpointing frequency of a given checkpoint for a given computing node based on a comparison of a risk metric associated with the given computing node and a threshold, thereby implementing holistic fault tolerance, in which prediction and prevention of potential faults occurs across the distributed computing system.

In some embodiments, the system redirects jobs to computing nodes having risk metrics that are less than the threshold.

In some embodiments, the signals include telemetry signals measured in the computing system. Moreover, the signals may be associated with different types of sensors in the computing system.

In some embodiments, the risk metrics include alerts that are associated with degradation of components in the computing nodes.

In some embodiments, the pattern-recognition technique includes a sequential probability ratio test (SPRT) and/or a nonlinear, nonparametric regression technique.

In some embodiments, the threshold corresponds to a false-alarm frequency. This false-alarm frequency may be associated with an exponentially distributed random variable.

In some embodiments, the anomalous signals are identified based on a slope of a cumulative function of the risk metric over time. For example, an amount of degradation of a component in the given computing node may correspond to a magnitude and/or a rate of change in the mean or standard deviation of the slope. Note that the slope may be independent of units of one or more received signals that are used to determine the risk metric.

In some embodiments, the given checkpoint is configured to interrupt operation of the given computing node and to store a current state of a job executing on the given computing node for use in subsequent recovery of the job.

In some embodiments, the system executes jobs on computing nodes having risk metrics that are less than the threshold on additional nodes.

Another embodiment provides a method including at least some of the above-described operations.

Another embodiment provides a computer-program product that facilitates the above-described operations on the system.

Another embodiment provides the system, which can be a computer system.

Another embodiment provides the system that includes: multiple coupled computing nodes that execute multiple jobs and multiple checkpoints, where a given checkpoint is associated with a given computing node. This system may be configured to perform at least some of the above-described operations.

BRIEF DESCRIPTION OF THE FIGURES

FIG. 7A is a graph of a step function degradation in a telemetry signal in accordance with an embodiment of the present invention.

FIG. 7B is a graph of the corresponding MCF curve of the telemetry signal in FIG. 7A in accordance with an embodiment of the present invention.

Note that like reference numerals refer to corresponding parts throughout the drawings.

DETAILED DESCRIPTION

Figure 1:
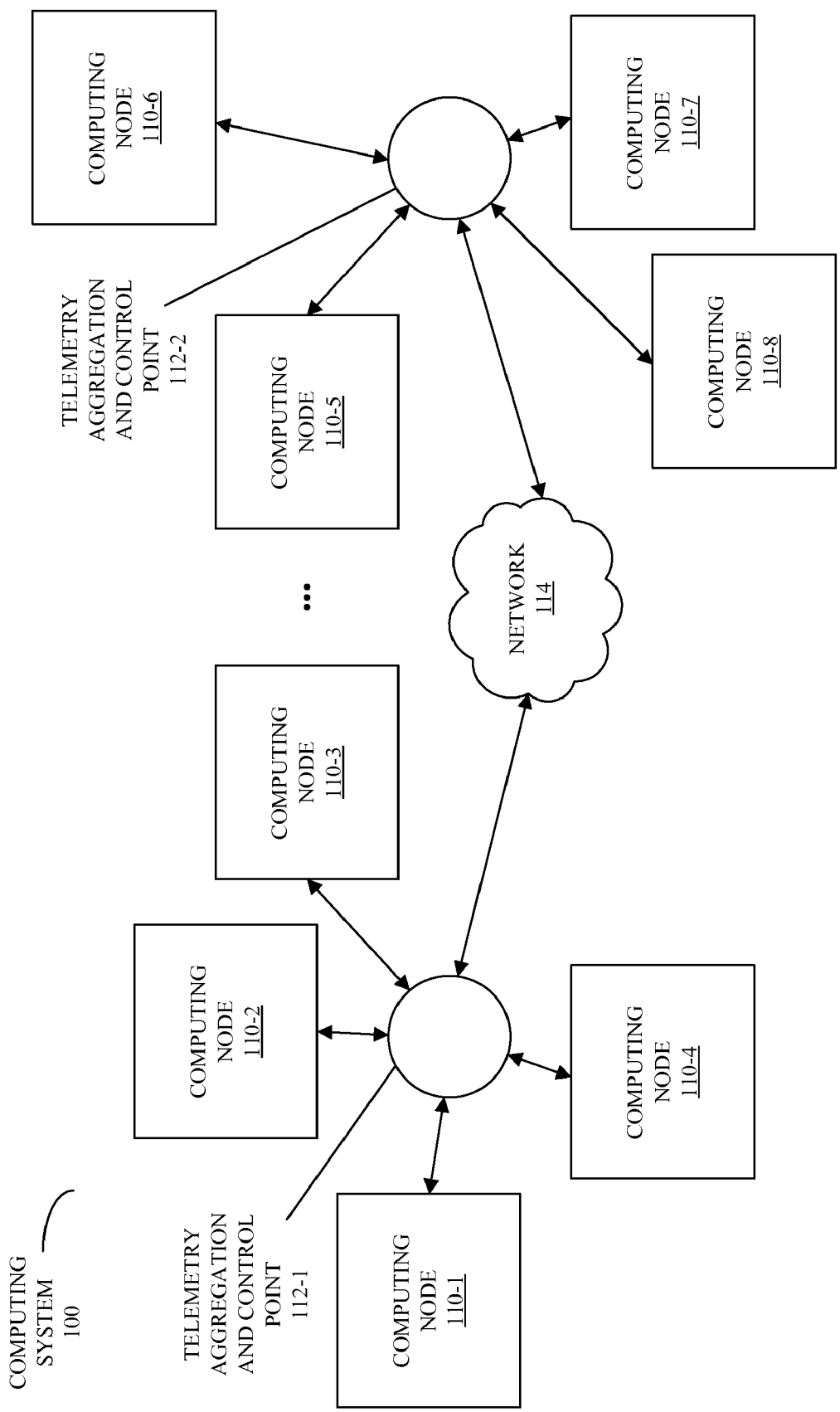
FIG. 1 is a block diagram illustrating a computer system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a system (such as a computer system), a method, and a computer-program product (i.e., software) for use with the system are described. These devices, systems and processes may be used to adjust a checkpointing frequency in a computing system, such as a distributed high-performance computing system (for example, a tera-scale or peta-scale grid computing system), that executes multiple jobs. Note that this computing system may include or may be the same as the system.

In particular, signals associated with the operation of computing nodes in the computer system may be measured using a continuous telemetry monitoring system in the computing system. Then, the signals may be analyzed to identify anomalous signals and to determine risk metrics for the computing nodes. For example, the anomalous signals may be identified and/or the risk metrics may be determined using a pattern recognition technique, such as a sequential probability ratio test (SPRT) and/or a nonlinear, nonparametric regression technique (e.g., a multivariate state estimation technique or MSET). Moreover, in some embodiments the anomalous signals may be identified based on a slope of a cumulative function (such as a magnitude of a rate of change in the mean or standard deviation of the slope) of a risk metric for a given computing node over time.

Note that the risk metrics may include alerts that are associated with degradation of components in the computing nodes. Consequently, based on comparisons of the risk metric for the given computing node and at least one threshold corresponding to a false-alarm frequency, the checkpointing of the given checkpoint for the given computing node may be adjusted. For example, if the given computing node is deemed to be at risk for a failure, checkpointing of the given computing node may be actuated.

Additionally, jobs in the computing system may be redirected to computing nodes having risk metrics that are less than the threshold. For example, jobs may be shifted to computing nodes that have low risk metrics (i.e., that are not currently at risk).

By adjusting the checkpointing and/or redirecting jobs, these techniques may facilitate prediction and prevention of failures in the computing system, thereby providing a holistic approach for achieving global fault tolerance in the computing system. Moreover, these techniques may facilitate improved performance, reliability, availability and serviceability of the computing system even if the bandwidth of the optical links (and more generally, the communication channels) between the computing nodes have an annual growth rate that is lower than that of other components in the computer system. In particular, the computing system may be scaled, thereby allowing massive parallel processing of jobs, without degrading the overall performance associated with periodic checkpointing, because the checkpoints may be actuated infrequently and only when warranted based on the risk metrics.

In some embodiments, the preceding technique implements 'holistic fault tolerance,' in which a fault-tolerant backplane achieves prediction and prevention across a geographically distributed grid. This capability may solve a pressing worldwide 'grand challenge' in the high performance computing community.

While a distributed high-performance computing system is used as an illustration in the following discussion, in other embodiments these techniques may be used with a wide variety of computer systems, including: servers, laptop computers, personal computers, work stations, mainframe computers, a digital signal processor, a portable-computing device, a personal organizer, a device controller, and a computational engine within an appliance, as well as with those computer systems that utilize symmetric multiprocessing (SMP) and/or multiprocessor system on-chip (MPSoC) architectures.

Note that the term MSET as used in this specification refers to a class of pattern-recognition techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington, D.C., Nov. 13-17, 2000. This paper outlines several different pattern-recognition approaches. Hence, the term MSET as used in this specification can refer to (among other things) any technique outlined in [Gribok], including: ordinary least squares (OLS), support vector machines (SVM), artificial neural networks (ANNs), MSET, or regularized MSET (RMSET).

Additionally, note that the computing system may be at one location or may be distributed over multiple, geographically dispersed locations. Consequently, instructions and/or data associated with processes or jobs that are executed by the computing system may be received and communicated within the computing system over a network, such as: the Internet or World Wide Web (WWW) an intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices.

We now describe embodiments of a computing system, the system, a method, and software for adjusting a checkpointing frequency and/or to redistribute jobs. FIG. 1 presents a block diagram illustrating a computing system 100. This computing system includes multiple computing nodes 110, which execute multiple jobs. These computing nodes are coupled to each other by links (such as optical links) to telemetry aggregation and control points 112 and, then, via a network 114, such as the Internet. These connections allow the jobs to be distributed over the computing nodes 110, and allow at least some of the jobs to be processed in parallel with each other.

Additionally, computing system 100 may include checkpoints that perform checkpointing of the computing nodes 110. For example, checkpoints may be included in the telemetry aggregation and control points 112. Alternatively, the checkpoints may be implemented separately from the telemetry aggregation and control points 112.

In some embodiments, computing system 100 includes continuous-telemetry monitoring, for example, via optional physical sensors. These optional physical sensors may be included in the computing nodes 110, for example, on one or more integrated circuits, such as one or more processors. This continuous-telemetry monitoring (which is described further below with reference to FIG. 2) may be used to measure one or more physical variables and/or additional parameters (such as performance metrics) of the computing system 100. In some embodiments, the optional physical sensors include thermal sensors (such as thermocouples or ring oscillators), which measure temperature at different locations in the computing system 100.

In order to avoid the challenges associated with periodic or regular checkpointing of the computing nodes 110, telemetry signals monitored using the continuous telemetry monitoring may be used to determine risk metrics for the computing nodes 110. For example, the SPRT may be used to generate warning flags when anomalies appear in the monitored telemetry signals which indicate that there has been degradation of one of the computing nodes 110. If the frequency of warning flags exceeds a false-alarm frequency or probability, a risk metric greater than a threshold may be asserted, and checkpointing may be performed on the affected computing node (s) 110. (Alternatively, jobs may be redirected to computing nodes 110 that have risk metrics which are less than the threshold). This event-initiated checkpointing and/or control may facilitate reliable, distributed, high-performance computing systems, such as grid computing, even if the growth rate of the input/output bandwidth of the links in these computing systems is slower than that of other components.

In some embodiments, computing system 100 includes fewer or additional components. Moreover, two or more components may be combined into a single component and/or a position of one or more components may be changed.

Figure 2:
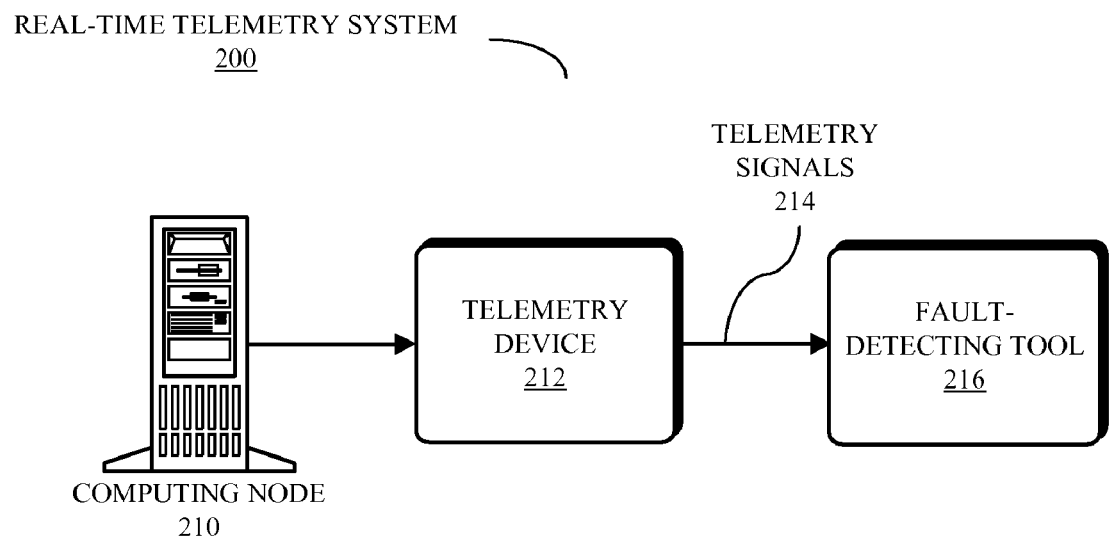
FIG. 2 is a block diagram illustrating a real-time telemetry system in accordance with an embodiment of the present invention.

We now describe embodiments of a continuous-telemetry-monitoring system. FIG. 2 presents a block diagram illustrating a real-time telemetry system 200. Real-time telemetry system 200 contains computing node 210, such as one of the computing nodes 110 (FIG. 1) in computing system 100 (FIG. 1). Computing node 210 can generally include any computing node including a mechanism for servicing requests from a client for computational and/or data storage resources. In some embodiments, computing node 210 is a uniprocessor or multiprocessor server that is being monitored by real-time telemetry system 200.

Real-time telemetry system 200 also contains telemetry device 212, which gathers telemetry signals 214 in real-time from the various sensors and monitoring tools within computing node 210 during operation of computing node 210, and which directs telemetry signals 214 to a local or a remote location that contains fault-detecting tool 216. In some embodiments, measurements are performed: as needed, continuously, or when driven by an event (such as an interrupt).

Note that telemetry signals 214 gathered by real-time telemetry system 200 can include signals associated with physical and/or software performance parameters measured through sensors within a computing system, such as the computing system 100 (FIG. 1). These physical parameters can include, but are not limited to: distributed temperatures within computing nodes in the computing system, relative humidity, cumulative or differential vibrations within the computing nodes in the computing system, fan speed, acoustic signals, currents, voltages, current noise, voltage noise, time-domain reflectometry (TDR) readings, and miscellaneous environmental variables. Moreover, the software parameters can include, but are not limited to: load metrics (such as load on one or more processors or processor cores, load on a memory, and/or load on a cache), CPU utilization, idle time, memory utilization, disk activity, transaction latencies, system throughput, queue lengths, I/O traffic, bus saturation metrics, FIFO overflow statistics, and other performance metrics or operational profiles gathered by 'virtual sensors' located within the operating system.

Fault-detecting tool 216 may monitor and analyze telemetry signals 214 in real-time. Specifically, fault-detecting tool 216 may detect anomalies in telemetry signals 214 and may predict probabilities of faults and failures in computing node 210. In some embodiments, fault-detecting tool 216 is a Continuous System Telemetry Harness (CSTH). This CSTH may process the telemetry signals 214 using a pattern-recognition technique, such as the SPRT and/or a nonlinear, nonparametric regression technique. For example, the SPRT may provide a technique for monitoring noisy process variables and detecting the incipience or onset of anomalies in such processes with high sensitivity. In some embodiments, telemetry device 212 and fault-detecting tool 216 are both embedded in computing node 210 which is being monitored.

In some embodiments, real-time telemetry system 200 includes fewer or additional components. Moreover, two or more components may be combined into a single component and/or a position of one or more components may be changed.

Figure 3:
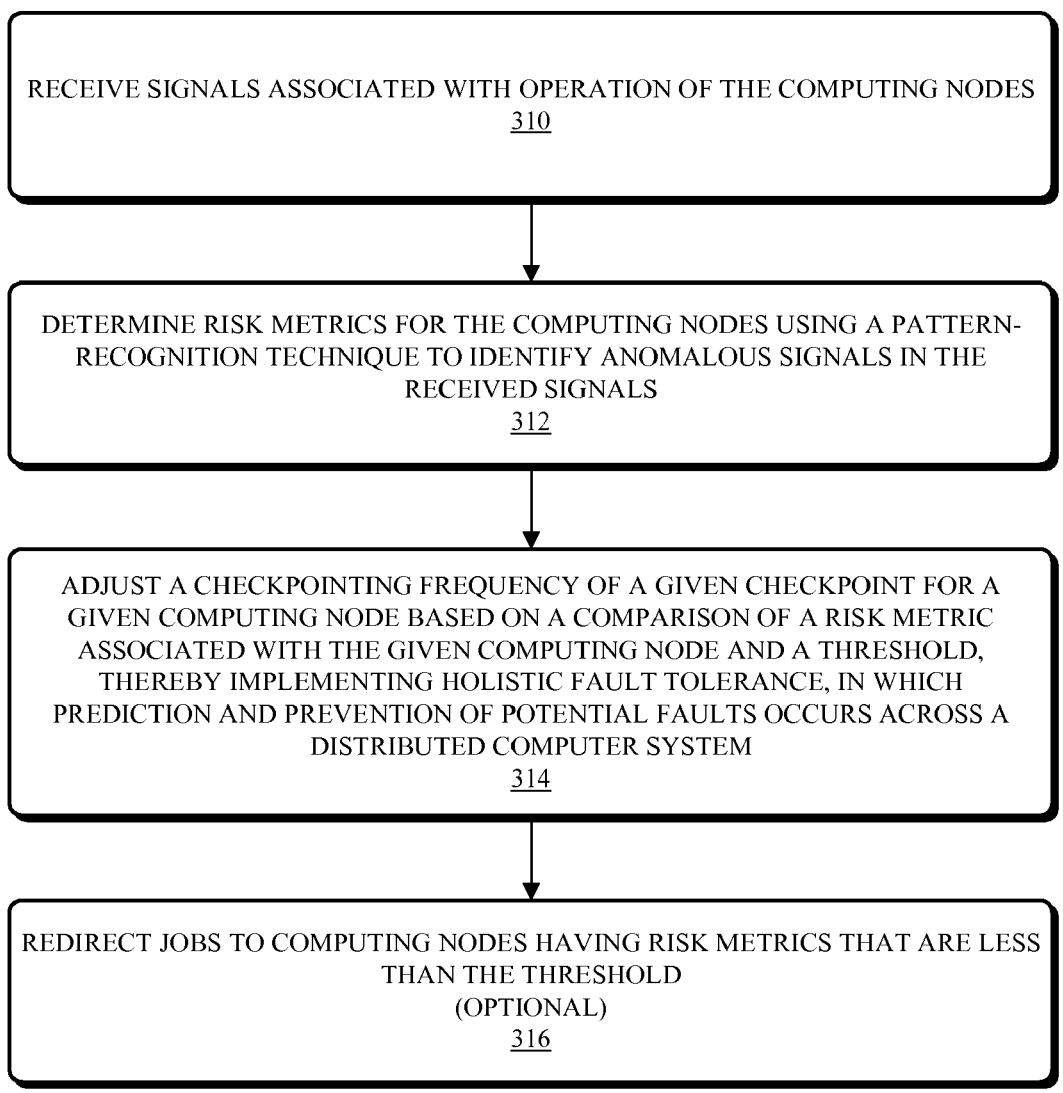
FIG. 3 is a flowchart illustrating a process for adjusting a checkpointing frequency in a computing system that executes multiple jobs in accordance with an embodiment of the present invention.

We now describe methods for adjusting a checkpointing frequency in a computing system that executes multiple jobs. FIG. 3 presents a flowchart illustrating a process 300 for adjusting a checkpointing frequency in a distributed computing system that executes multiple jobs, which may be performed by a system (such as a computer system) that is included in or is associated with a computing system. During operation, the system receives signals associated with operation of the computing nodes (310). Then, the system determines risk metrics for the computing nodes using a pattern-recognition technique to identify anomalous signals in the received signals (312). Next, the system adjusts a checkpointing frequency of a given checkpoint for a given computing node based on a comparison of a risk metric associated with the given computing node and a threshold (314), thereby implementing holistic fault tolerance in which prediction and prevention of potential faults occurs across the distributed computing system. Moreover, in some embodiments the system optionally redirects jobs to computing nodes having risk metrics that are less than the threshold (316).

Note that in some embodiments of process 300 there may be additional or fewer operations. Moreover, the order of the operations may be changed and/or two or more operations may be combined into a single operation. Additionally, the preceding operations may be implemented using hardware and/or software, as is known in the art.

We now describe exemplary embodiments for determining risk metrics, which can be used to adjust the checkpointing frequency and/or to redistribute jobs. One of the challenges of high sensitivity proactive fault monitoring is to tell when there is a change point in the mean of a previously stationary time series of samples of a telemetry signal. This change could signify: degradation in a power supply, deterioration of a connector, loss of electrolyte in a capacitor, degradation in a fan motor affecting system temperatures, and/or many other mechanisms that cause servers to fail.

In the discussion that follows, the SPRT is used as an illustration of an analysis technique that can be used to analyze the monitored telemetry signals 214 (FIG. 2). SPRT is a binary hypothesis test that analyzes process observations sequentially to determine whether or not the signal is consistent with normal behavior. When the SPRT reaches a decision about current process behavior (e.g., the signal is behaving normally or abnormally), it reports the decision and continues to process observations. In particular, the SPRT generates warning flags/alarms when anomalies are detected in the monitored signals.

Note that the SPRT can generate alarms even when the monitored signals contain no degradation. In such a case, the frequency of SPRT alarms is typically very low and less than a pre-assigned 'false-alarm probability' (FAP). This FAP specifies the probability of making a failure hypothesis when, in fact, a non-failure hypothesis holds. Note that, for mathematical reasons, the FAP cannot be zero.

False alarms typically do not present any problem as long as the associated frequency of the false alarm is smaller than the FAP which is specified when initializing the SPRT. However, when the frequency of SPRT alarms exceeds the FAP, a problem is signaled for the monitored component, system, or process. For example, when FAP is set to be 0.01, it means that about 1 out of 100 observations, on average, will produce a false alarm. When the frequency of the occurrences of SPRT alarms is more than 0.01, this indicates that there is a problem in the monitored component, system, or process (i.e., that the risk metric exceeds the threshold).

A time between successive SPRT alarms is referred to as the inter-arrival time (IAT). The IAT is an exponentially distributed random variable when there is no degradation in the monitored telemetry signal. Note that the IAT can be measured in different time scales (e.g., second, minute, hour, etc.), depending upon the sampling rate of the monitored telemetry signal. Moreover, IAT measurement is not limited to time. Other measurements of the distance between successive SPRT alarms can be in terms of: number of cycles, number of incidents, or number of observations.

Figure 4A:
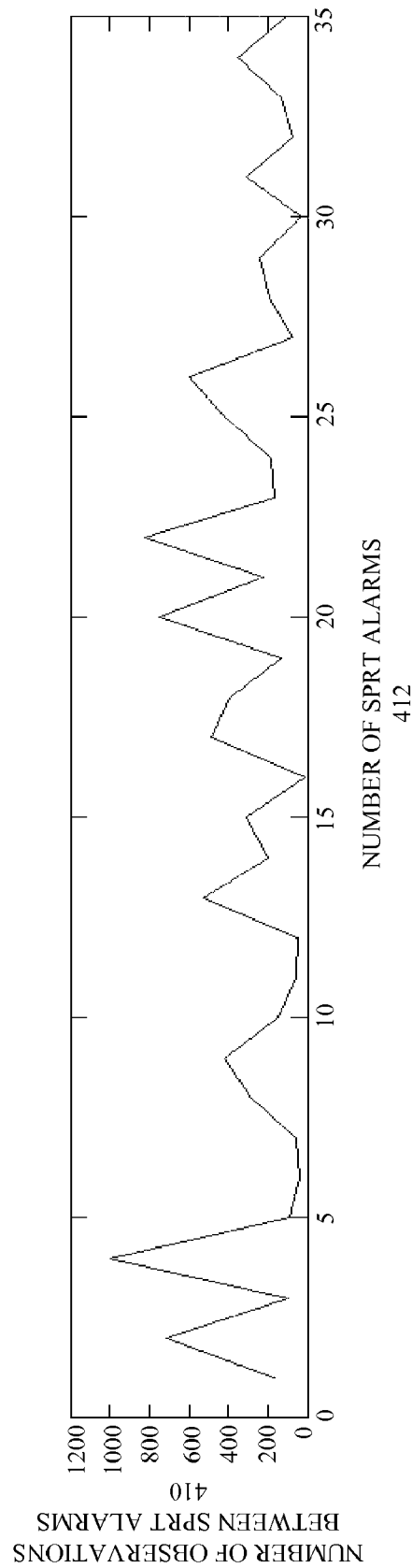
FIG. 4A is a graph of an Inter-Arrival Time (IAT) as a function of a cumulative number of sequential probability ratio test (SPRT) alarms for a monitored telemetry signal with no degradation in accordance with an embodiment of the present invention.

FIG. 4A presents a graph of the IAT as a function of a cumulative number of SPRT alarms for a monitored telemetry signal with no degradation. Note that the vertical axis of each point in FIG. 4A represents the number of observations between successive SPRT alarms 410, which follows a random process, and the horizontal axis of FIG. 4A represents the cumulative number of SPRT alarms 412.

We introduce a 'Mean Cumulative Function' (MCF), which represents a cumulative number of SPRT alarms as a function of time, or number of observations. To compute an MCF, a running total number of the SPRT alarms for each new observation or sampling time is tracked. If an SPRT alarm is generated for a newly received sample value, the MCF is incremented by one. Otherwise, the MCF maintains its previous value for this sample value.

Figure 4B:
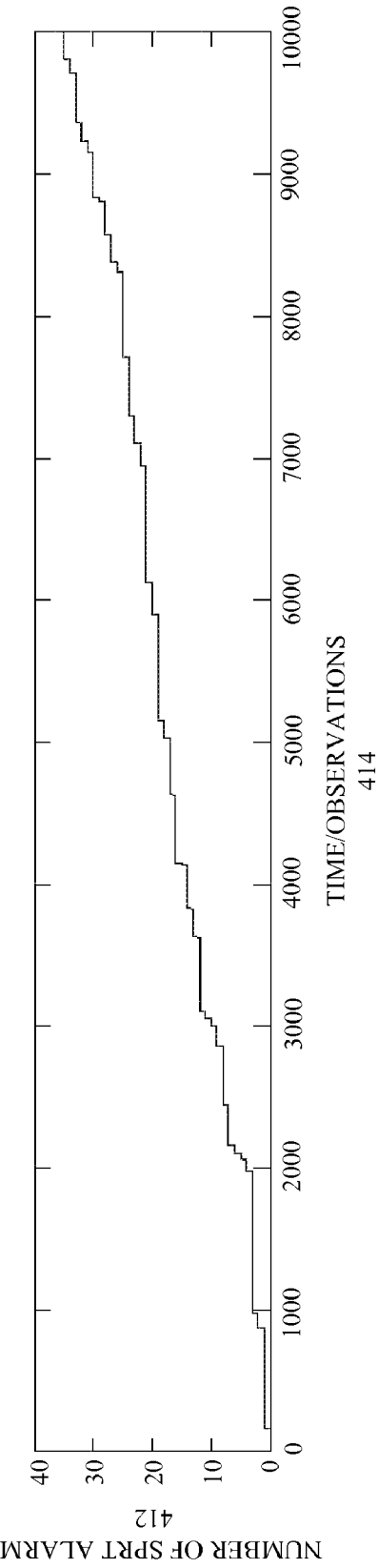
FIG. 4B is a graph of the associated mean cumulative function (MCF) for the SPRT alarms represented in FIG. 4A in accordance with an embodiment of the present invention.

FIG. 4B presents a graph of the associated MCF for the SPRT alarms represented in FIG. 4A, where the vertical axis represents the cumulative number of SPRT alarms 412 and the horizontal axis represents time or sequence of observations 414. Note that for the telemetry signal in FIG. 4A (which has no apparent degradation), the associated IAT follows a random process, while the associated MCF versus time/observation plot changes linearly with time/observation (see also "Applied Reliability," 2nd Edition, Chapter 10, Tobias, P. A., and Trindade, D. C., New York: Van Nostrand Reinhold, 1995). Consequently, the slope of the MCF curve for a telemetry signal with no degradation is nearly a constant.

On the other hand, if degradation suddenly appears in a monitored telemetry signal, the frequency of the SPRT alarms starts increasing dramatically, which subsequently causes the MCF value to also increase rapidly. As a result, the slope of the MCF curve, which measures the rate of the MCF change with time/observation, increases as well. Hence, the slope of an MCF curve can provide a quantitative measure of the frequency of SPRT alarms, which can be used as an indicator of the degree of severity of degradation in the original monitored telemetry signal.

Note that one advantage of integrating an MCF approach with an SPRT alert frequency is that the slope of the MCF curve removes any dependence upon the magnitude, noisiness, or units for the original processes under surveillance. Consequently, this approach can be used with a wide variety of telemetry signals, which can be compared against each other to assess their degrees of degradation.

Figure 5:
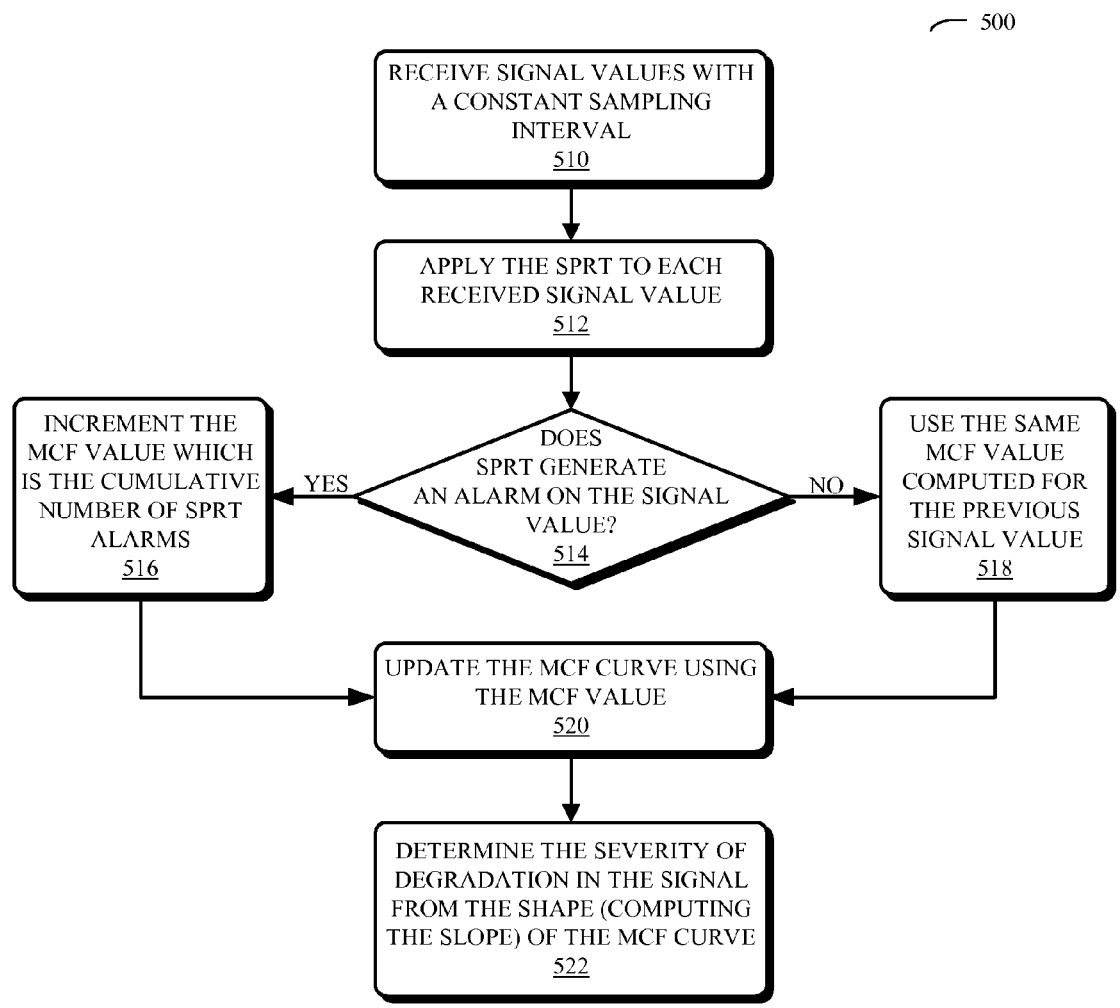
FIG. 5 is a flowchart illustrating a process for determining the severity of degradation in a telemetry signal in accordance with an embodiment of the present invention.

FIG. 5 presents a flowchart illustrating a process 500 for determining the severity of degradation in a telemetry signal, which may be performed by a computer system. During operation, the computer system receives a signal with a constant sampling interval (510). Next, for each received signal value, the computer system applies the SPRT to the signal value (512).

Then, the computer system determines if the SPRT generates an alarm on the signal value (514). If so, the computer system increments an associated MCF value which keeps track of a running total number of the SPRT alarms (516). However, if the SPRT does not generate an alarm on the signal value, the MCF value for the current signal value assumes the previous MCF value computed for the previous signal value (518). Moreover, the computer system updates an MCF curve for the received signal value using the MCF value (520).

Additionally, the computer system determines the severity of degradation in the signal from the shape of the MCF curve (522). In some embodiments, the computer system determines the severity of degradation from the shape of the MCF curve by computing the slope of the MCF curve, where an increase in the slope of the MCF curve indicates an increasing severity of degradation in the signal.

In some embodiments of process 500 there may be additional or fewer operations. Moreover, the order of the operations may be changed and/or two or more operations may be combined into a single operation. Additionally, the preceding operations may be implemented using hardware and/or software, as is known in the art.

Note that because the IAT in time/observations between successive SPRT alarms can be noisy, the associated MCF curve can also appear 'choppy' in response. In order to reduce the effect of noisiness in the MCF curve, in some embodiments the slope of the MCF curve is computed using a predetermined window size, which contains a predetermined number of successive data values. This computation can be performed using a linear interpolation or a linear regression using these data values. Moreover, note that the number of successive data values used to compute the slope may be carefully chosen. When a larger number is used, the computation can reduce the effect of noisiness in the MCF curve but can lose some responsiveness. On the other hand, when a smaller number is used, the computation result is more instantaneous but will lose some smoothness. Therefore, in some embodiments the number of data values used to compute the slope based on the frequency of the SPRT alarms is constantly adjusted, where the number can be gradually reduced as the frequency increases.

Additionally, note that the degradation in a signal can show up in different forms which would result in different behaviors in the MCF curve and the associated slope of the MCF curve. However, different forms of degradation will cause the MCF curve to show two types of slope behavior: (1) the slope increases continuously with time/observations; or (2) the slope increases abruptly from a smaller value to a larger value and remains at the larger value.

Figure 6A:
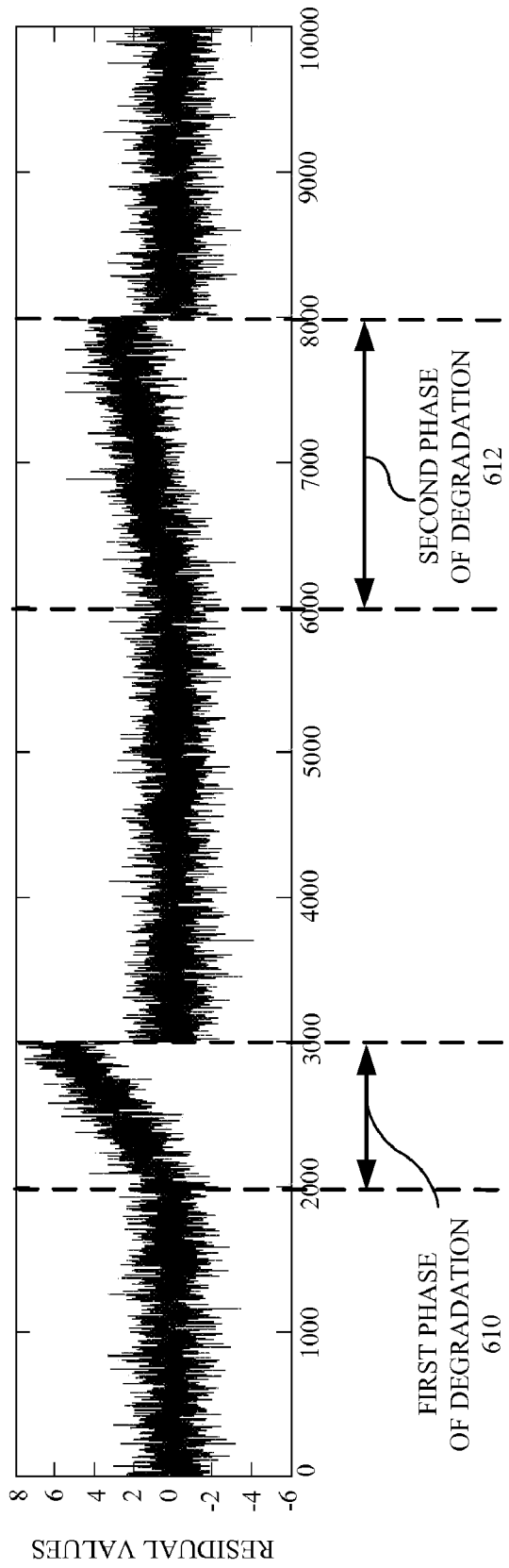
FIG. 6A is a graph of two phases of degradation in a telemetry signal with different degrees of severity in accordance with an embodiment of the present invention.

FIG. 6A presents a graph of two phases of degradation in a telemetry signal with different degrees of severity. Note that the first phase of the degradation 610 occurs around 2000 to 3000 observations with a higher degree of severity (a more rapid drift upward), whereas the second phase of the degradation 612 occurs around 6000 to 8000 observations with a lower degree of severity (a less rapid drift upward).

Figure 6B:
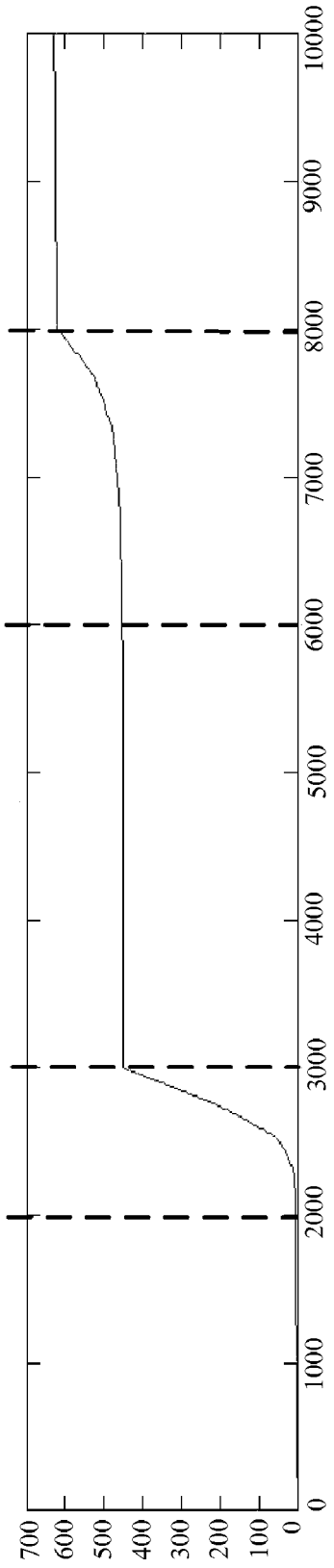
FIG. 6B is a graph of the corresponding MCF curve of the telemetry signal in FIG. 6A in accordance with an embodiment of the present invention.

FIG. 6B presents a graph of the corresponding MCF curve of the telemetry signal in FIG. 6A. Note that in FIG. 6B there is a concurrent first phase of slope increase around 2000 to 3000 observations. Before 2000 observations, the MCF curve demonstrates a normal linear behavior, and after 3000 observations, the telemetry signal returns to normal, and hence, the slope of the corresponding MCF curve returns to the same small constant value as before 2000 observations. During the second phase of the degradation 612 (FIG. 6A), the slope of the MCF curve in FIG. 6B again increases continuously, indicating the degradation is recurring. However, the slopes between 6000 and 8000 observations increase at a slower rate than the rate between 2000 and 3000 observations. Note that the slope can be used as a quantitative metric for the degree of severity of the degradation.

FIG. 7A presents a graph of a step function degradation in a telemetry signal. Instead of a gradual but increasing degradation as shown in FIG. 6A, the step function degradation 710 jumps up to a risky level abruptly and remains at the risky level. FIG. 7B presents a graph of the corresponding MCF curve of the telemetry signal in FIG. 7A. In this graph, the slope increases abruptly from a smaller value to a significantly larger value at around 4000 observations, which is when the step function degradation 710 (FIG. 7A) in the telemetry signal occurs. Then, the slope remains at the larger value until the end of degradation 710 (FIG. 7A) at around 6000 observations, and drops back down to the same smaller value for the signal before degradation 710 (FIG. 7A). Once again, the slope of the MCF curve provides a quantitative risk metric associated with the degree of degradation or 'risk' for the monitored computing system.

Note that generally when a fault-detection system attempts to establish certain criteria for detecting degradation based on original telemetry signals, the fault-detection system is dependent on the magnitude, noisiness, or units of the original telemetry signals. By integrating an MCF approach with an SPRT alarm frequency, the slope of the MCF curve removes any dependency on the magnitude, noisiness, or units for the original signal under surveillance, and provides a dimensionless, quantitative metric for the degree of severity in the original telemetry signal.

Moreover, note that in the preceding discussion we have assumed that a departure from stationary behavior in a telemetry signal is an indication of the degradation, which is the case for many monitored telemetry signals in computing systems. Additionally, we have assumed that the farther the telemetry signal deviates from its nominal value and the faster it departs from its nominal value, the more severe the degradation is.

In some embodiments, the degradation in the telemetry signal includes increasing noisiness or instability. This may occur without a change in the mean of the telemetry signal versus time. Nonetheless, in this case the frequency of SPRT alerts increases, and there is a concomitant increase in the slope of the MCF. Consequently, this technique can be used to determine degradation in the mean of the telemetry signal, as well as variance degradation resulting from increasing signal noise or process instability.

In some embodiments, the risk assessment metric may be used for proactive job migration to nodes with lower risk indices, for example, during distributed parallel computation (such as message-passing parallelization). During message-passing parallelization, a large job is divided into N chunks, which are then distributed across N nodes to run in parallel. Because the chunks complete, the overall job is completed in approximately 1/Nth the amount of time than when the job is run on one node. However, in this type of distributed parallel computing, if a single job chunk is almost completed, but then has to be started over on a new node because it was migrated, it could complete on the new node much later than all the other chunks are completing on their original nodes. This would be very undesirable because the whole job would not complete until that last chunk was completed on the new node (after it was migrated).

To avoid the situation where a 'straggler' chunk, which was migrated to a different node, holds up the completion of the overall distributed job, a chunk may not be migrated from a risky node to a less risky node and then started over. Instead, the chunk on the risky node may be parallelized on multiple other nodes that are not running anything. For example, if a chunk is migrated to five empty nodes, and then it is parallelized on those five nodes, processing of this chunk is increased by nearly a factor of five. This makes it much more likely that the chunk will complete not too long after the original chunks on their original nodes are completed.

For example, when a large high-performance-computing (HPC) job is launched across the geographically distributed computing system, a small fraction (for example, 2-4%) of the available nodes are initialized and left in an active state, but do not participate in the current computations. These are so called 'setaside' nodes. The HPC job is distributed across the active nodes, which comprise nominally 96-98% of the available nodes. Risk-assessment metrics may be continuously monitored for all the nodes using a SPRT-MCF technique, as described previously. If the risk-assessment metric becomes larger than a small pre-specified threshold for any node in the computing system, then the workload assigned to that node may be immediately parallelized across the setaside nodes.

Figure 8:
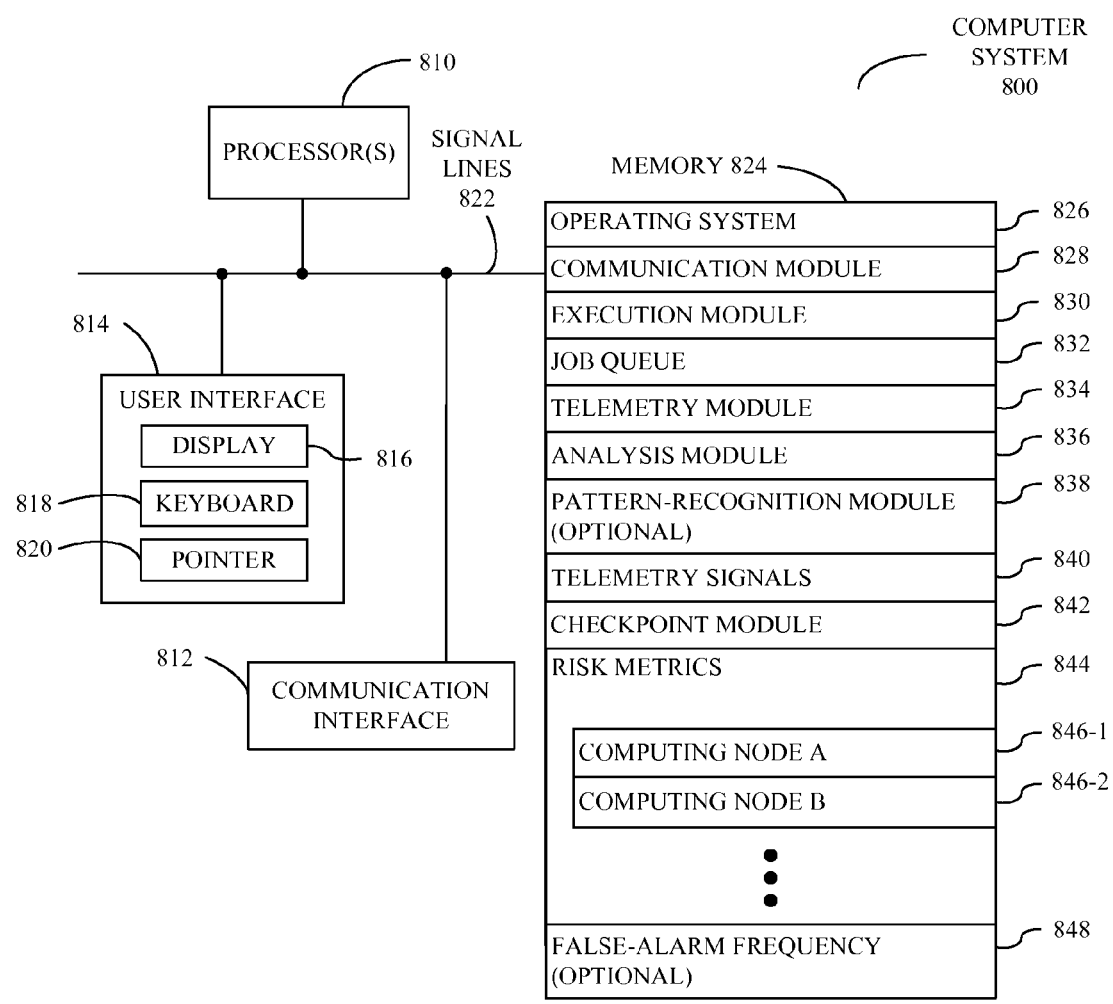
FIG. 8 is a block diagram illustrating a computer system in accordance with an embodiment of the present invention.

We now describe additional embodiments of a computer system. FIG. 8 presents a block diagram illustrating an embodiment of computer system 800, which may encompass at least a portion of computing system 100 (FIG. 1). Computer system 800 includes: one or more processors (or processor cores) 810 (which may be included in one or more computing nodes), a communication interface 812, a user interface 814, and one or more signal lines 822 coupling these components together. Note that the one or more processors (or processor cores) 810 may support parallel processing and/or multi-threaded operation, the communication interface 812 may have a persistent communication connection, and the one or more signal lines 822 may constitute a communication bus. Moreover, the user interface 814 may include: a display 816, a keyboard 818, and/or a pointer 820, such as a mouse.

Memory 824 in the computer system 800 may include volatile memory and/or non-volatile memory. More specifically, memory 824 may include: ROM, RAM, EPROM, EEPROM, flash, one or more smart cards, one or more magnetic disc storage devices, and/or one or more optical storage devices. Memory 824 may store an operating system 826 that includes procedures (or a set of instructions) for handling various basic system services for performing hardware-dependent tasks. Moreover, memory 824 may also store communications procedures (or a set of instructions) in a communication module 828. These communication procedures may be used for communicating with one or more computers, devices and/or servers, including computers, devices and/or servers that are remotely located with respect to the computer system 800.

The described embodiments can include a computer-program product for use in conjunction with a computer system. In these embodiments, the computer-program product can include a computer-readable storage medium. The computer-readable storage medium can include one or more of the above-described volatile memory and/or non-volatile memory, such as ROM, RAM, EPROM, EEPROM, flash, one or more smart cards, one or more magnetic disc storage devices, and/or one or more optical storage devices. The computer-readable storage medium can include an embedded/incorporated computer-program mechanism.

Memory 824 may also include one or more program modules (or a set of instructions), including: execution module 830 (or a set of instructions), telemetry module 834 (or a set of instructions), analysis module 836 (or a set of instructions), optional pattern-recognition module 838 (or a set of instructions), and/or checkpoint module 842 (or a set of instructions). During operation of the computer system 800, execution module 830 performs one or more processes, such as one or more of the jobs in job queue 832. While the jobs are executing telemetry module 834 may measure telemetry signals 840 associated with one or more computing nodes, which may include the processors 810. Note that the telemetry signals 840 may be associated with different types of sensors in the computer system 800.

Then, analysis module 836 may identify anomalous signals in the telemetry signals 840 that are associated with one or more computing nodes and may determine one or more risk metrics 844, such as risk metrics associated with computing node A 846-1 or computing node B 846-2. For example, the risk metrics 844 may include alerts that are associated with degradation of components in one or more computing nodes in computer system 800.

In some embodiments, the anomalous signals are identified and/or the one or more risk metrics 844 are determined using optional pattern-recognition module 838. For example, the optional pattern-recognition module 838 may include: an SPRT; a nonlinear, nonparametric regression technique (such as a MSET; and/or cumulative function of one or more risk metrics 844 over time. In some embodiments, an amount of degradation of a component in a given computing node may correspond to a magnitude and/or a rate of change in the mean or standard deviation of a slope of the cumulative function. Note that the slope may be independent of units of one or more telemetry signals 840.

Based on one or more risk metrics 844, checkpoint module 842 may adjust a checkpointing frequency of a given checkpoint for a given computing node in computer system 800. For example, based on a comparison of a risk metric associated with the given computing node and a threshold corresponding to an optional false-alarm frequency 848, the checkpointing frequency of the given checkpoint may be increased or decreased. In some embodiments, the optional false-alarm frequency 848 is associated with an exponentially distributed random variable. Additionally, execution module 830 may redirect jobs to computing nodes having risk metrics 844 that are less than the threshold.

Note that in some embodiments the anomalous signals are identified and/or the one or more risk metrics 844 are determined: while the jobs are performed; during a training mode (e.g., between execution of jobs); and/or as needed.

Instructions in the various modules in the memory 824 may be implemented in: a high-level procedural language, an object-oriented programming language, and/or in an assembly or machine language. The programming language may be compiled or interpreted, i.e., configurable or configured, to be executed by the one or more processors (or processor cores) 810.

Although the computer system 800 is illustrated as having a number of discrete components, FIG. 8 is intended to be a functional description of the various features that may be present in the computer system 800 rather than a structural schematic of the embodiments described herein. In practice, and as recognized by those of ordinary skill in the art, the functions of the computer system 800 may be distributed over a large number of servers or computers, with various groups of the servers or computers performing particular subsets of the functions. In some embodiments, some or all of the functionality of the computer system 800 may be implemented in one or more application-specific integrated circuits (ASICs) and/or one or more digital signal processors (DSPs).

Computer system 800 may include fewer components or additional components. Moreover, two or more components may be combined into a single component and/or a position of one or more components may be changed. In some embodiments the functionality of computer system 800 may be implemented more in hardware and less in software, or less in hardware and more in software, as is known in the art.

Figure 9:
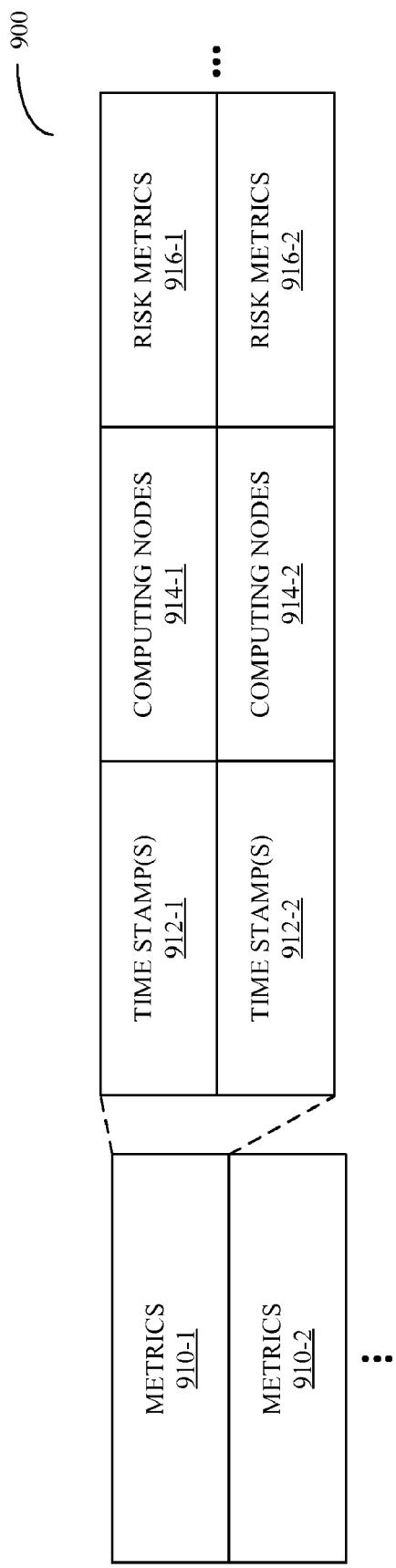
FIG. 9 is a block diagram illustrating a data structure in accordance with an embodiment of the present invention.

We now discuss data structures that may be used in the computing system 100 (FIG. 1) and/or computer system 800. FIG. 9 presents a block diagram illustrating an embodiment of a data structure 900. This data structure may include metrics 910. More specifically, a given instance of the metrics 910, such as metric 910-1, may include multiple entries for: one or more time stamp(s) 912, one or more computing nodes 914, and/or one or more risk metrics 916.

Note that that in some embodiments of the data structure 900 there may be fewer or additional components. Moreover, two or more components may be combined into a single component and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for adjusting a checkpointing frequency in a distributed computing system that executes multiple jobs, comprising:
   receiving signals associated with operation of the computing nodes;
   determining risk metrics for the computing nodes using a pattern-recognition technique to identify anomalous signals in the received signals; and
   adjusting a checkpointing frequency of a given checkpoint for a given computing node based on a comparison of a risk metric associated with the given computing node and a threshold, thereby implementing holistic fault tolerance, in which prediction and prevention of potential faults occurs across the distributed computing system.

2. The method of claim 1, further comprising redirecting jobs to computing nodes having risk metrics that are less than the threshold.

3. The method of claim 1, wherein the signals include telemetry signals measured in the computing system.

4. The method of claim 1, wherein the signals are associated with different types of sensors in the computing system.

5. The method of claim 1, wherein the risk metrics include alerts that are associated with degradation of components in the computing nodes.

6. The method of claim 1, wherein the pattern-recognition technique includes a sequential probability ratio test (SPRT).

7. The method of claim 1, wherein the pattern-recognition technique includes a nonlinear, nonparametric regression technique.

8. The method of claim 1, wherein the threshold corresponds to a false-alarm frequency; and
   wherein the false-alarm frequency is associated with an exponentially distributed random variable.

9. The method of claim 1, wherein the anomalous signals are identified based on a slope of a cumulative function of the risk metric over time.

10. The method of claim 9, wherein an amount of degradation of a component in the given computing node corresponds to a magnitude of change in the mean or standard deviation of the slope.

11. The method of claim 9, wherein an amount of degradation of a component in the given computing node corresponds to a rate of change in the mean or standard deviation of the slope.

12. The method of claim 9, wherein the slope is independent of units of one or more received signals that are used to determine the risk metric.

13. The method of claim 1, wherein the given checkpoint is configured to interrupt operation of the given computing node and to store a current state of a job executing on the given computing node for use in subsequent recovery of the job.

14. The method of claim 1, further comprising executing jobs on computing nodes having risk metrics that are less than the threshold on additional nodes.

15. A computer-program product for use in conjunction with a computer system, the computer-program product comprising a computer-readable storage medium and a computer-program mechanism embedded therein for adjusting a checkpointing frequency in a distributed computing system that executes multiple jobs on computing nodes, comprising:
   instructions for receiving signals associated with operation of the computing nodes;
   instructions for determining risk metrics for the computing nodes using a pattern-recognition technique to identify anomalous signals in the received signals; and
   instructions for adjusting a checkpointing frequency of a given checkpoint for a given computing node based on a comparison of a risk metric associated with the given computing node and a threshold, thereby implementing holistic fault tolerance, in which prediction and prevention of potential faults occurs across the distributed computing system.

16. The computer-program product of claim 15, further comprising instructions for redirecting jobs to computing nodes having risk metrics that are less than the threshold.

17. The computer-program product of claim 15, wherein the risk metrics include alerts that are associated with degradation of components in the computing nodes.

18. The computer-program product of claim 15, wherein the pattern-recognition technique includes a sequential probability ratio test (SPRT).

19. The computer-program product of claim 15, wherein the pattern-recognition technique includes a nonlinear, nonparametric regression technique.

20. A distributed computer system, comprising:
   multiple coupled computing nodes that execute multiple jobs;
   multiple checkpoints, wherein a given checkpoint is associated with a given computing node;
   memory; and
   a program module, wherein the program module is stored in the memory and configured to be executed by a processor, which is included in at least one of the computing nodes, to adjust a checkpoint frequency of one or more checkpoints, the program module including:
      instructions for receiving signals associated with operation of the computing nodes;
   instructions for determining risk metrics for the computing nodes using a pattern-recognition technique to identify anomalous signals in the received signals; and
   instructions for adjusting a checkpointing frequency of the given checkpoint based on a comparison of a risk metric and a threshold, thereby implementing holistic fault tolerance, in which prediction and prevention of potential faults occurs across the distributed computing system.

* * * * *